United States Patent
Yi et al.

(10) Patent No.: US 9,447,870 B2
(45) Date of Patent: Sep. 20, 2016

(54) POWER GEAR-SHIFTING TRANSMISSION AND ENGINEERING MACHINERY

(75) Inventors: Xiaogang Yi, Changsha (CN); Songqing Li, Changsha (CN); Qiang Chen, Changsha (CN)

(73) Assignees: Hunan Sany Intelligent Control Equipment Co., Ltd., Changsha (CN); Sany Heavy Industry Co., Ltd., Changsha (CN)

( * ) Notice: Subject to any disclaimer, the term of this patent is extended or adjusted under 35 U.S.C. 154(b) by 126 days.

(21) Appl. No.: 14/376,589

(22) PCT Filed: Apr. 12, 2012

(86) PCT No.: PCT/CN2012/073915
§ 371 (c)(1),
(2), (4) Date: Oct. 13, 2014

(87) PCT Pub. No.: WO2013/117045
PCT Pub. Date: Aug. 15, 2013

(65) Prior Publication Data
US 2015/0027253 A1    Jan. 29, 2015

(30) Foreign Application Priority Data
Feb. 6, 2012 (CN) .......................... 2012 1 0025313

(51) Int. Cl.
*B60W 10/02* (2006.01)
*F16D 67/04* (2006.01)
(Continued)

(52) U.S. Cl.
CPC .......... *F16H 61/0267* (2013.01); *F16D 25/10* (2013.01); *F16D 48/0206* (2013.01); *F16H 1/02* (2013.01); *F16H 63/3026* (2013.01); *F16D 2048/0269* (2013.01); *F16H 2061/004* (2013.01); *Y10T 74/19251* (2015.01)

(58) Field of Classification Search
CPC ..... F16D 67/04; F16D 2121/04; F16D 25/14
USPC .......................................... 74/335; 192/12 C
See application file for complete search history.

(56) References Cited

U.S. PATENT DOCUMENTS 4,774,857 A * 10/1988 Heine .................... B60K 17/08
192/12 C
5,551,548 A *  9/1996 Shubinsky .......... F16D 25/0638
192/106 F (Continued)

FOREIGN PATENT DOCUMENTS

CN          201129437 Y      10/2008
CN          201155552 Y      11/2008
(Continued)

*Primary Examiner* — Ha D Ho
(74) *Attorney, Agent, or Firm* — Bret E. Field; Bozicevic, Field & Francis LLP

(57) ABSTRACT

The present invention provides a power gear-shifting transmission and an engineering machinery. The power gear-shifting transmission comprises a clutch shaft assembly (1). The clutch shaft assembly (1) comprises a clutch shaft (11), a housing gear (12) arranged on the clutch shaft (11), a clutch disc (13) arranged within the housing gear (12), and a gear-shifting piston (14) arranged at one end of the clutch disc (13). The gear-shifting piston (14) is pushed by a clear hydraulic medium introduced via a fluid supply passage (3); the clean hydraulic medium is supplied by a hydraulic system (2). The engineering machinery comprises the power gear-shifting transmission.

20 Claims, 3 Drawing Sheets

(51) Int. Cl.
*F16H 61/02* (2006.01)
*F16D 25/10* (2006.01)
*F16D 48/02* (2006.01)
*F16H 63/30* (2006.01)
*F16H 1/02* (2006.01)
*F16H 61/00* (2006.01)

(56) References Cited

U.S. PATENT DOCUMENTS 5,655,983 A * 8/1997 Dick .................. B60K 17/3505
418/32
8,342,051 B2 * 1/2013 Pritchard ................. F16H 3/006
74/331
8,622,859 B2 * 1/2014 Babbitt .................... B60K 6/12
475/1
8,678,967 B2 * 3/2014 Reimann ................. F16H 47/04
475/1

FOREIGN PATENT DOCUMENTS

| CN | 101749401 A | 6/2010 |
| CN | 202441876 U | 9/2012 |
| EP | 1808619 A1 | 7/2007 |

* cited by examiner

POWER GEAR-SHIFTING TRANSMISSION AND ENGINEERING MACHINERY

This application claims the priority of Chinese Patent Application No. 201210025313.3, entitled "Power Gear-Shifting Transmission and Engineering Machinery", filed on Feb. 6, 2012 with the State Intellectual Property Office of the PRC, which is incorporated herein by reference in its entirety.

FIELD OF THE INVENTION

The present invention involves the technical field of power gear shifting, and more specifically, relates to a power gear-shifting transmission, particularly to a transmission which conducts power gear shifting using an additionally introduced clean hydraulic medium, and to an engineering machinery with the power gear-shifting transmission.

BACKGROUND OF THE INVENTION

Currently the gear shifting of a power gear-shifting transmission uses a gear oil in the chamber of the transmission as a control oil to achieve gear shifting, and this power gear-shifting manner has following problems:

1. the gear oil can be easily mixed with air due to high speed rotation of the gear in a gear box and then has bubble, and the gear oil having many bubbles, which is used as a control oil to conduct gear shifting, will render the gear shifting pressure of the gear box unstable and then easily burn out a clutch friction disc;

2. the cleanliness of the oil in the transmission has great influence on the gear shifting pressure; as the oil in the transmission in the prior art is oil subjected to high speed rotation of the gear, it has minute impurities, which renders insufficient gear shifting pressure and then affects the gear shifting;

3. the oil level of a gear oil usually bumps with the whole machine, which easily renders air suction of a gear shifting pump, and then also renders unstable gear shifting pressure, and if the oil level of the gear oil is increased, a churning loss will be huge; and 4. for an engineering machinery such as a grader, it also has the problem that the gear shifting pump easily sucks air during uphill and downhill, and the gear shifting pump has the hidden trouble of sucking air.

SUMMARY OF THE INVENTION

To solve the above problems or at least one of such problems of power gear shifting in the prior art that the gear shifting pressure is unstable, the gear shifting oil is not clean and has bubbles, and the gear shifting pump easily sucks air, the present invention provides a power gear-shifting transmission which satisfactorily overcomes the above defects in the prior art.

The power gear-shifting transmission provided by the present invention comprises a clutch shaft assembly, and the clutch shaft assembly comprises a clutch shaft, a housing gear arranged on the clutch shaft, a clutch disc arranged within the housing gear, and a gear-shifting piston arranged at one end of the clutch disc, characterized in that, the gear-shifting piston is pushed by a clean hydraulic medium introduced via a fluid supply passage, and the clean hydraulic medium is supplied by a hydraulic system.

In the above technical solution, preferably, the clutch shaft is provided with the fluid supply passage of the gear-shifting piston, and the inlet of the fluid supply passage is provided on a flow distribution cover at one end of the clutch shaft.

In the above technical solution, preferably, the flow distribution cover is further provided with a discharge port.

In the above technical solution, preferably, the clutch disc comprises a left clutch disc and a right clutch disc symmetrically arranged, and the gear-shifting piston comprises a left gear-shifting piston cooperating with the left clutch disc and a right gear-shifting piston cooperating with the right clutch disc, the fluid supply passage comprises a first fluid supply passage connected with the left gear-shifting piston and a second fluid supply passage connected with the right gear-shifting piston, and the inlet comprises a first inlet of the first fluid supply passage and a second inlet of the second fluid supply passage.

In the above technical solution, preferably, the first inlet is provided in the end face or side face of the flow distribution cover, the second inlet is provided in the side face or end face of the flow distribution cover, and the discharge port is provided in the side face or end face of the flow distribution cover.

In the above technical solution, preferably, a first seal member is provided between the second inlet and the discharge port, a second seal member is provided between the discharge port and the inner chamber of the power gear-shifting transmission, a third seal member is provided between the gear-shifting piston and the housing gear, and a fourth seal member is provided between the gear-shifting piston and the clutch shaft.

In the above technical solution, preferably, the first seal member is mounted on the clutch shaft, the second seal member is mounted on the flow distribution cover, and the third seal member and the fourth seal member are mounted on the gear-shifting piston.

In the above technical solution, preferably, the first seal member is a seal ring, the second seal member is a framework oil seal, and the third seal member and the fourth seal member are seal washers.

In the above technical solution, preferably, the hydraulic system comprises a hydraulic power source, a hydraulic valve and a pipeline, and the hydraulic power source and the hydraulic valve are sequentially connected through the pipeline, and the outlet of the hydraulic valve is in communication with the fluid supply passage.

In the above technical solution, preferably, the hydraulic system further comprises a one-way valve, an accumulator and a pressure alarm, and the one-way valve is mounted at the outlet of the hydraulic power supply, the accumulator and the pressure alarm are connected with the pipeline behind the outlet of the one-way valve, and when the pressure in the hydraulic system is lower than a set pressure value, the pressure alarm sends out an alarm signal.

In the above technical solution, preferably, a hydroelectric converter is further provided at the outlet of the hydraulic valve for converting a hydraulic signal to an electric signal.

In the above technical solution, preferably, the hydraulic valve comprises two two-position three-way electromagnetic reversing valves, and one valve position of the two-position three-way electromagnetic reversing valves enables the communication between the fluid supply passage and the hydraulic power source and the other valve position enables the communication between the fluid supply passage and the storage tank of the hydraulic medium.

In the above technical solution, preferably, the clean hydraulic medium is a clean hydraulic oil, the hydraulic power source is a host hydraulic pump, and the accumulator is a gas separation type accumulator.

Or, the hydraulic valve comprises a three-position four-way electromagnetic valve, and when it is located at a left position, one said fluid supply passage is made to communicate with the hydraulic power source, and the other said fluid supply passage communicates with the storage tank of the hydraulic medium; when it is located at a right position, one said fluid supply passage is made to communicate with the storage tank of the hydraulic medium, and the other said fluid supply passage communicates with the hydraulic power source; when it is located at a middle position, the fluid supply passages both communicate with the storage tank of the hydraulic medium.

Due to using a separately provided hydraulic system to provide the transmission gear-shifting piston with a clean gear-shifting power medium with stable pressure, the above power gear-shifting transmission of the present invention overcomes the defects in the prior art that the oil is not clean, the pressure is not stable, bubbles are contained, the gear-shifting pump easily sucks air as the gear oil in the gear-shifting transmission box is used as the power oil of the transmission gear-shifting piston, thoroughly solves the problem in the prior art that the cleanliness of the gear of the gear box and the air suction of the gear-shifting pump easily render fluctuation of the gear-shifting pressure, and has advantages of stable gear shifting and long service life.

The engineering machinery of the present invention can be obtained through applying any power gear-shifting transmission of the above technical solutions to an engineering machinery, such as a grader, a loader and a bulldozer, and the engineering machinery has advantages of stable gear shifting and long service life.

DETAILED DESCRIPTION OF THE PRESENT INVENTION

The specific embodiments according to the present invention will be described hereinafter in combination with the drawings.

The following description throws lights on many details for fully understanding of the present invention, however, the present invention can also be implemented with other manners different from those described herein, thus the present invention is not limited to the following disclosed embodiments.

Figure 1:
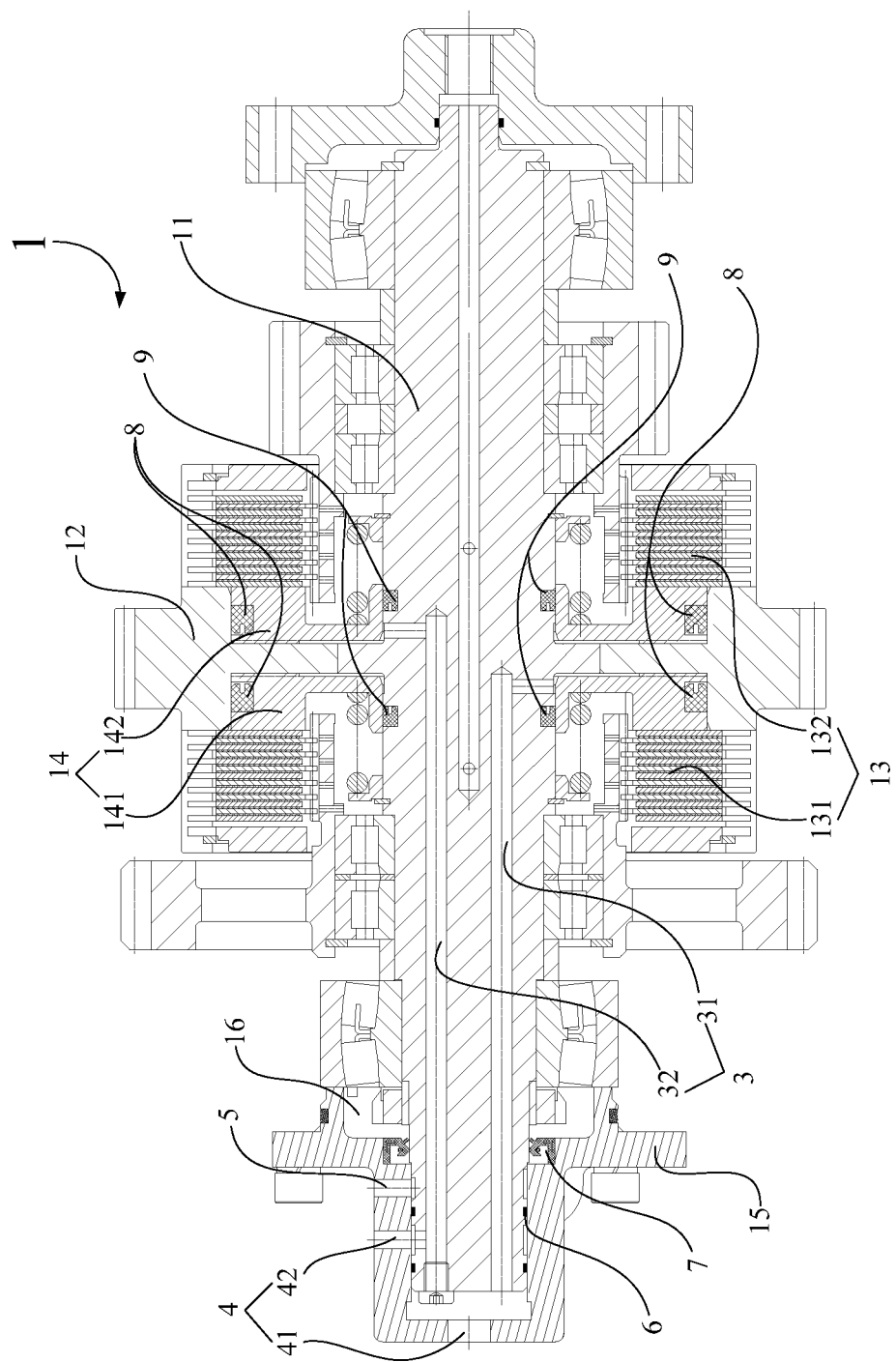
FIG. 1 is a schematic diagram of the section structure of the clutch shaft assembly of an embodiment of the power gear-shifting transmission of the present invention.
Figure 2:
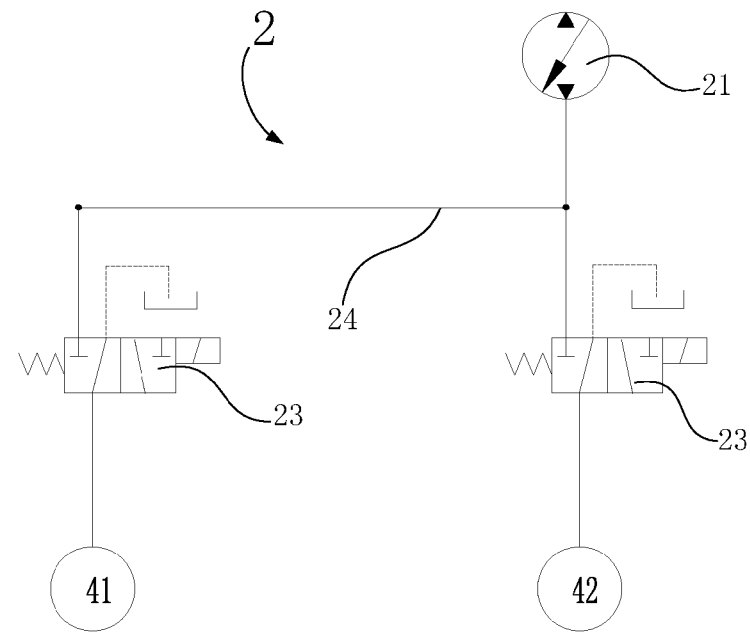
FIG. 2 is a schematic diagram of a connection of the hydraulic system of an embodiment of the power gear-shifting transmission of the present invention.

FIG. 1 is a schematic diagram of the section structure of the clutch shaft assembly of an embodiment of the power gear-shifting transmission of the present invention; FIG. 2 is a schematic diagram of a connection of the hydraulic system of an embodiment of the power gear-shifting transmission of the present invention.

As shown in FIG. 1, the power gear-shifting transmission provided by the present invention comprises a clutch shaft assembly 1, and the clutch shaft assembly 1 comprises a clutch shaft 11, a housing gear 12 arranged on the clutch shaft 11, a clutch disc 13 arranged within the housing gear 12, and a gear-shifting piston 14 arranged at one end of the clutch disc 13, and the gear-shifting piston 14 is pushed by a clean hydraulic medium introduced via a fluid supply passage 3, and the clean hydraulic medium is supplied by a hydraulic system 2. In this embodiment, due to using the hydraulic system 2 to individually provide the transmission gear-shifting piston 14 with a clean gear-shifting hydraulic medium with stable pressure, the defects in the prior art are overcome that the hydraulic oil is not clean, the pressure is not stable, bubbles are contained, the gear-shifting pump easily sucks air as the gear oil in the gear-shifting transmission box is used as the power oil of the transmission gear-shifting piston, and the problem in the prior art is thoroughly solved that the cleanliness of the gear of the gear box and the air suction of the gear-shifting pump easily render fluctuation of the gear-shifting pressure. The above power gear-shifting transmission in this embodiment has advantages of stable gear shifting and long service life.

In this embodiment, preferably, the clutch shaft 11 is provided with the fluid supply passage 3, and the inlet 4 of the fluid supply passage 3 is provided on a flow distribution cover 15 at one end of the clutch shaft 11. The arrangement manner of the fluid supply passage can fully use the original parts of the power gear-shifting transmission, and the structure and arrangement are reasonable and simple and achieve low cost.

In this embodiment, preferably, the flow distribution cover 15 is further provided with a discharge port 5. Providing both the inlet and the discharge port in the flow distribution cover makes sealing the clean hydraulic medium convenient, so as to prevent the clean hydraulic medium from mixing with the gear oil in the chamber of the power gear-shifting transmission.

In this embodiment, preferably, the clutch disc 13 comprises a left clutch disc 131 and a right clutch disc 132 symmetrically arranged, and the gear-shifting piston 14 comprises a left gear-shifting piston 141 cooperating with the left clutch disc 131 and a right gear-shifting piston 142 cooperating with the right clutch disc 132, the fluid supply passage 3 comprises a first fluid supply passage 31 connected with the left gear-shifting piston 141 and a second fluid supply passage 32 connected with the right gear-shifting piston 142, and the inlet 4 comprises a first inlet 41 of the first fluid supply passage 31 and a second inlet 42 of the second fluid supply passage 32. This preferable configuration manner of the parts of the two-shift transmission achieves a compact structure and a reasonable arrangement.

In this embodiment, preferably, the first inlet 41 is provided in the end face of the flow distribution cover 15, the second inlet 42 is provided in the side face of the flow distribution cover 15, and the discharge port 5 is provided in the side face of the flow distribution cover 15. This makes sealing the clean hydraulic medium convenient. Of course, the first inlet can also be provided in the side face of the flow distribution cover, and the second inlet and the discharge port can also be provided in the end face of the flow distribution cover.

In this embodiment, a first seal member 6 is provided between the second inlet 42 and the discharge port 5, a second seal member 7 is provided between the discharge port 5 and the inner chamber 16 of the power gear-shifting transmission, a third seal member 8 is provided between the gear-shifting piston 14 and the housing gear 12, and a fourth seal member 9 is provided between the gear-shifting piston 14 and the clutch shaft 11. The first seal member separates the inlet and discharge port of the clean hydraulic medium, the second seal member seals all the clean hydraulic medium within the flow distribution cover so that it does not enter the chamber of the power gear-shifting transmission, the third seal member and the fourth seal member separate the clean hydraulic medium acting on the gear-shifting piston from the lubricant of the clutch disc at the other side of the piston, which avoids polluting the clean hydraulic medium.

In this embodiment, preferably, the first seal member 6 is mounted on the clutch shaft 11, the second seal member 7 is mounted on the flow distribution cover 15, and the third seal member 8 and the fourth seal member 9 are mounted on the gear-shifting piston 14. This makes the processing of seal grooves and the mounting of the seal members convenient.

In this embodiment, preferably, the first seal member 6 is a seal ring, the second seal member 7 is a framework oil seal, and the third seal member 8 and the fourth seal member 9 are seal washers. The first seal member uses a form of seal ring and then is suitable for the rotational seal of the present invention and achieves fine seal effect and long service life; the second seal member uses framework oil seal and can completely separate little discharged clean hydraulic oil between the inner chamber of the power gear-shifting transmission and the discharge cover; the seal demand on the third seal member and the fourth seal member is not high, and using seal washers saves cost.

As shown in FIG. 2, in this embodiment, the hydraulic system 2 comprises a hydraulic power source 21, a hydraulic valve 23 and a pipeline 24, and the hydraulic power source 21 and the hydraulic valve 23 are sequentially connected through the pipeline 24, and the outlet of the hydraulic valve 23 is in communication with the fluid supply passage 3 of the gear-shifting piston 14. Using this hydraulic system to individually provide the gear-shifting piston with a hydraulic medium can provide a clean hydraulic medium containing no bubbles with a stable pressure, so that the gear-shifting piston achieves stable gear shifting; the hydraulic valve can control the on/off, flow direction and etc. of the hydraulic medium, and achieve controlling the gear shifting action of the power gear-shifting transmission.

Figure 3:
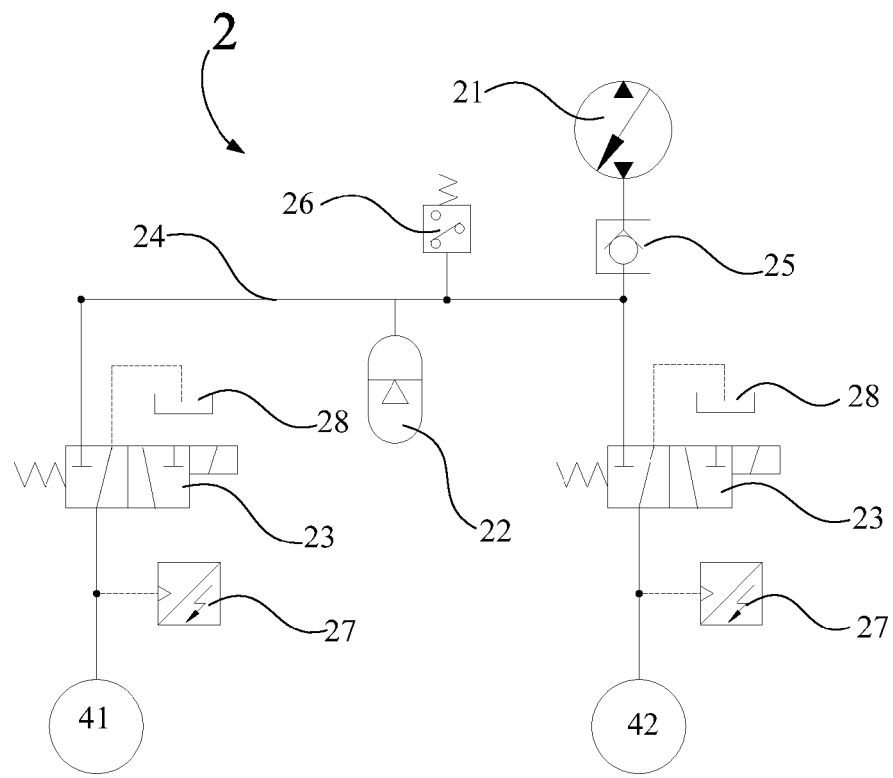
FIG. 3 is a schematic diagram of another connection of the hydraulic system of an embodiment of the power gear-shifting transmission of the present invention.

FIG. 3 is a schematic diagram of another connection of the hydraulic system of an embodiment of the power gear-shifting transmission of the present invention.

As shown in FIG. 3, preferably, the hydraulic system 2 further comprises a one-way valve 25, an accumulator 22 and a pressure alarm 26, and the one-way valve 25 is mounted at the outlet of the hydraulic power supply 21, the accumulator 22 and the pressure alarm 26 are connected with the pipeline 24 behind the outlet of the one-way valve 25, and when the pressure in the hydraulic system 2 is lower than a set pressure value, the pressure alarm 26 sends out an alarm signal. Using the one-way valve can improve the stability of the working pressure in the hydraulic system, and the use of the accumulator can achieve smaller pressure fluctuation of the hydraulic system and a stable pressure, which better helps the operation of the clutch disc, and damaging the hydraulic power source such as the hydraulic pump due to instant impact is avoided, and the pressure alarm can stop the power gear-shifting transmission in the situation of a low pressure, which then will not be damaged.

In this embodiment, preferably, a hydroelectric converter 27 is further provided at the outlet of the hydraulic valve 23 for converting a hydraulic signal to an electric signal. This can directly gather the hydraulic signal at the inlet of the fluid supply passage, then pave way for knowing pressure situation, real-time monitoring, automatic control and etc., and achieve low cost.

In this embodiment, preferably, the hydraulic valve 23 comprises two two-position three-way electromagnetic reversing valves, and one valve position of the two-position three-way electromagnetic reversing valves enables the communication between the fluid supply passage 3 and the hydraulic power source 21 and the other valve position enables the communication between the fluid supply passage 3 and the storage tank 28 of the hydraulic medium. Using two two-position three-way electromagnetic reversing valves can achieve separate and remote control over the gear shifting action of each shift.

In this embodiment, preferably, the clean hydraulic medium is a clean hydraulic oil, the hydraulic power source 21 is a host hydraulic pump, and the accumulator 22 is a gas separation type accumulator. Using the hydraulic oil as the clean hydraulic medium achieves the lowest cost, and the oil having a large viscosity and small compression ratio is suitable for the gear-shifting operation of the power gear-shifting transmission and is a preferable hydraulic medium, and of course, using emulsion or other hydraulic medium is also fine, while its effect is not as good as the hydraulic oil. Using the hydraulic pump in the host as the power source of the hydraulic system can save cost, for example, in practice using the port G of the pump to provide the pressure oil is an embodiment, of course, an separately provided hydraulic pump can also be used to provide oil. Using the gas separation type accumulator achieves low cost and fine effect.

Figure 4:
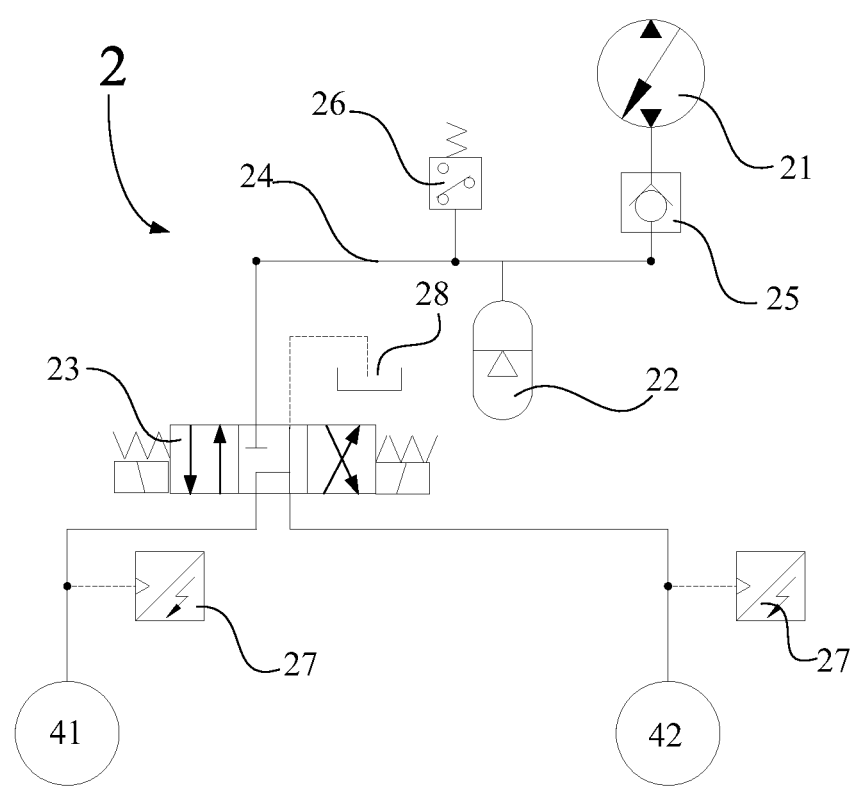
FIG. 4 is a schematic diagram of another connection of the hydraulic system of an embodiment of the power gear-shifting transmission of the present invention.

FIG. 4 is a schematic diagram of another connection of the hydraulic system of an embodiment of the power gear-shifting transmission of the present invention.

As shown in FIG. 4, preferably, the hydraulic system 2 comprises a hydraulic power source 21, an accumulator 22, a reversing hydraulic valve 23, a pipeline 24, a one-way valve 25 and a pressure alarm 26, and the hydraulic power source 21, the one-way valve 25, the accumulator 22 and the reversing hydraulic valve 23 are sequentially connected through the pipeline 24, the accumulator 22 and the pressure alarm 26 are connected at the pipeline 24 behind the outlet of the one-way valve 25, and the reversing hydraulic valve 23 comprises a three-position four-way electromagnetic reversing valve, and when it is located at a left position, one said fluid supply passage 3 is made to communicate with the hydraulic power source 21, and the other said fluid supply passage 3 communicates with the storage tank 28 of the hydraulic medium; when it is located at a right position, one said fluid supply passage 3 is made to communicate with the storage tank 28 of the hydraulic medium, and the other said fluid supply passage 3 communicates with the hydraulic power source 21; when it is located at a middle position, the fluid supply passages 3 both communicate with the storage tank 28 of the hydraulic medium. A hydroelectric converter 27 is further provided at the outlet of the three-position four-way electromagnetic reversing valve to convert a hydraulic signal to an electric signal. The hydraulic system can also achieve separate fluid supply and remote control over the gear-shifting piston, achieve stable power gear shifting and overcome the above defects of the prior art.

To sum up, due to using a hydraulic system to provide the transmission gear-shifting piston with a clean and bubble-free gear-shifting power oil with stable pressure, the above power gear-shifting transmission of the present invention overcomes the defects in the prior art that the oil is not clean, the pressure is not stable, bubbles are contained, the gear-shifting pump easily sucks air as the control oil in the gear-shifting transmission box is used as the power oil of the transmission gear-shifting piston, thoroughly solves the problem in the prior art that the cleanliness of the gear of the gear box and the air suction of the gear-shifting pump easily render fluctuation of the gear-shifting pressure, and has advantages of stable gear shifting and long service life.

The embodiments of the engineering machinery of the present invention can be obtained through applying the power gear-shifting transmission of the above embodiments to an engineering machinery, such as a grader, a loader and a bulldozer, and the engineering machinery of such embodiments has advantages of stable gear shifting and long service life. The grader is taken as an example, if the power gear-shifting transmission of the present invention is mounted on the grader, the grader can achieve stable gear shifting and long service life of the clutch disc, and can also achieve stable gear shifting in the situations of uphill and downhill.

Likewise, the power gear-shifting transmission of the present invention can be applied to engineering machinery such as loader and bulldozer, which can achieve the same advantageous effect with the grader and is not listed herein.

Described above are just preferable embodiments of the present invention and are not intended to restrict the present invention. For one skilled in the art, the present invention may have various modifications and variations. Any modifications, equivalent substitutions, improvements and etc. within the spirit and principle of the present invention shall all be contained within the scope of protection of the present invention.

The invention claimed is:

1. A power gear-shifting transmission, comprising a clutch shaft assembly (1), and the clutch shaft assembly (1) comprising a clutch shaft (11), a housing gear (12) arranged on the clutch shaft (11), a clutch disc (13) arranged within the housing gear (12), and a gear-shifting piston (14) arranged at one end of the clutch disc (13), wherein, the gear-shifting piston (14) is pushed by a clean hydraulic medium introduced via a fluid supply passage (3), and the clean hydraulic medium is supplied by a hydraulic system (2) and
   wherein the clutch shaft (11) is provided with the fluid supply passage (3), and the inlet (4) of the fluid supply passage (3) is provided on a flow distribution cover (15) at one end of the clutch shaft (11).

2. The power gear-shifting transmission according to claim 1, wherein, the flow distribution cover (15) is further provided with a discharge port (5).

3. The power gear-shifting transmission according to claim 2, wherein, the clutch disc (13) comprises a left clutch disc (131) and a right clutch disc (132) symmetrically arranged, and the gear-shifting piston (14) comprises a left gear-shifting piston (141) cooperating with the left clutch disc (131) and a right gear-shifting piston (142) cooperating with the right clutch disc (142), the fluid supply passage (3) comprises a first fluid supply passage (31) connected with the left gear-shifting piston (141) and a second fluid supply passage (32) connected with the right gear-shifting piston (142), and the inlet (4) comprises a first inlet (41) of the first fluid supply passage (31) and a second inlet (42) of the second fluid supply passage (32).

4. The power gear-shifting transmission according to claim 3, wherein, the first inlet (41) is provided in the end face or side face of the flow distribution cover (15), the second inlet (42) is provided in the side face or end face of the flow distribution cover (15), and the discharge port (5) is provided in the side face or end face of the flow distribution cover (15).

5. The power gear-shifting transmission according to claim 4, wherein, a first seal member (6) is provided between the second inlet (42) and the discharge port (5), a second seal member (7) is provided between the discharge port (5) and the inner chamber (16) of the power gear-shifting transmission, a third seal member (8) is provided between the gear-shifting piston (14) and the housing gear (12), and a fourth seal member (9) is provided between the gear-shifting piston (14) and the clutch shaft (11).

6. The power gear-shifting transmission according to claim 5, wherein, the first seal member (6) is mounted on the clutch shaft (11), the second seal member (7) is mounted on the flow distribution cover (15), and the third seal member (8) and the fourth seal member (9) are mounted on the gear-shifting piston (14).

7. The power gear-shifting transmission according to claim 6, wherein, the first seal member (6) is a seal ring, the second seal member (7) is a framework oil seal, and the third seal member (8) and the fourth seal member (9) are seal washers.

8. The power gear-shifting transmission according to claim 1, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

9. The power gear-shifting transmission according to claim 8, wherein, the hydraulic system (2) further comprises a one-way valve (25) and a pressure alarm (26), and the one-way valve is mounted at the outlet of the hydraulic power supply (21), the accumulator (22) and the pressure alarm (26) are connected with the pipeline (24) behind the outlet of the one-way valve (25), and when the pressure in the hydraulic system (2) is lower than a set pressure value, the pressure alarm (26) sends out an alarm signal.

10. The power gear-shifting transmission according to claim 9, wherein, a hydroelectric converter (27) is further provided at the outlet of the reversing valve (23) for converting a hydraulic signal to an electric signal.

11. The power gear-shifting transmission according to claim 10, wherein, the hydraulic valve (23) comprises two two-position three-way electromagnetic reversing valves, and one valve position of the two-position three-way electromagnetic reversing valves enables the communication between the fluid supply passage (3) and the hydraulic power source (21) and the other valve position enables the communication between the fluid supply passage (3) and the storage tank (28) of the hydraulic medium.

12. The power gear-shifting transmission according to claim 11, wherein, the clean hydraulic medium is a clean hydraulic oil, the hydraulic power source (21) is a host hydraulic pump, and the accumulator (22) is a gas separation type accumulator.

13. The power gear-shifting transmission according to claim 10, wherein, the hydraulic valve (23) comprises a three-position four-way electromagnetic reversing valve, and when it is located at a left position, one said fluid supply passage (3) is made to communicate with the hydraulic power source (21), and the other said fluid supply passage (3) communicates with the storage tank (28) of the hydraulic medium; when it is located at a right position, one said fluid supply passage (3) is made to communicate with the storage tank (28) of the hydraulic medium, and the other said fluid supply passage (3) communicates with the hydraulic power source (21); when it is located at a middle position, the fluid supply passages (3) both communicate with the storage tank (28) of the hydraulic medium.

14. The power gear-shifting transmission according to claim 2, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

15. The power gear-shifting transmission according to claim 3, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

16. The power gear-shifting transmission according to claim 4, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

17. The power gear-shifting transmission according to claim 5, wherein, the hydraulic system (2) comprises a hydraulic power source (21), a hydraulic valve (23) and a pipeline (24), and the hydraulic power source (21), an accumulator (22) and the hydraulic valve (23) are sequentially connected through the pipeline (24), and the outlet of the hydraulic valve (23) is in communication with the fluid supply passage (3) of the gear-shifting piston (14).

18. The power gear-shifting transmission according to claim 6, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

19. The power gear-shifting transmission according to claim 7, wherein, the hydraulic system (2) comprises a hydraulic power source (21), an accumulator (22), a hydraulic valve (23) and a pipeline (24), and the hydraulic power source (21), the accumulator (22) and the hydraulic valve (23) are sequentially connected through the pipeline (24), and the outlet of the hydraulic valve (23) is in communication with the fluid supply passage (3) of the gear-shifting piston (14).

20. An engineering machinery, wherein, comprising a power gear-shifting transmission which comprises a clutch shaft assembly (1), and the clutch shaft assembly (1) comprising a clutch shaft (11), a housing gear (12) arranged on the clutch shaft (11), a clutch disc (13) arranged within the housing gear (12), and a gear-shifting piston (14) arranged at one end of the clutch disc (13), wherein, the gear-shifting piston (14) is pushed by a clean hydraulic medium introduced via a fluid supply passage (3), and the clean hydraulic medium is supplied by a hydraulic system (2) and wherein the clutch shaft (11) is provided with the fluid supply passage (3), and the inlet (4) of the fluid supply passage (3) is provided on a flow distribution cover (15) at one end of the clutch shaft (11).

* * * * *